(12) United States Patent
Konishi et al.

(10) Patent No.: US 7,221,535 B2
(45) Date of Patent: May 22, 2007

(54) MAGNETIC RECORDING AND REPRODUCTION APPARATUS

(75) Inventors: Akio Konishi, Hyogo (JP); Koichiro Hirabayashi, Osaka (JP); Yoshiyuki Saito, Osaka (JP); Hiroshi Kurumatani, Hyogo (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 420 days.

(21) Appl. No.: 10/806,921

(22) Filed: Mar. 23, 2004

(65) Prior Publication Data
US 2004/0201916 A1 Oct. 14, 2004

(30) Foreign Application Priority Data
Mar. 24, 2003 (JP) .............................. 2003-080271

(51) Int. Cl.
*G11B 15/665* (2006.01)
(52) U.S. Cl. ...................................................... 360/85
(58) Field of Classification Search .................... None
See application file for complete search history.

(56) References Cited
U.S. PATENT DOCUMENTS

| | | | | |
|---|---|---|---|---|
| 6,256,167 | B1* | 7/2001 | Konishi et al. | 360/130.23 |
| 6,449,118 | B1* | 9/2002 | Choi et al. | 360/85 |
| 6,466,395 | B1* | 10/2002 | Matsuoka et al. | 360/85 |
| 6,567,234 | B2* | 5/2003 | Matsuoka et al. | 360/96.5 |
| 2001/0042807 | A1* | 11/2001 | Sawai et al. | 242/356.2 |
| 2003/0011924 | A1* | 1/2003 | Matsuoka et al. | 360/85 |

* cited by examiner

*Primary Examiner*—Hoa T. Nguyen
*Assistant Examiner*—Mark Blouin
(74) *Attorney, Agent, or Firm*—Renner, Otto, Boisselle & Sklar, LLP

(57) ABSTRACT

A magnetic recording and reproduction apparatus includes a main chassis having a rotatable head cylinder provided thereon; and a sub chassis on which a tape cassette is mountable. The sub chassis is movable with respect to the main chassis between a tape cassette mountable position and a tape pull-out completion position, and the tape cassette mountable position is a position at which the tape cassette is mountable on the sub chassis and the tape pull-out completion position is a position at which information recording to and information reproduction from the tape, which has been pulled out from the tape cassette and has been wound around the rotatable head cylinder, can be performed. A portion of the main chassis along a forward end thereof is cut out toward the rotatable head cylinder.

6 Claims, 16 Drawing Sheets

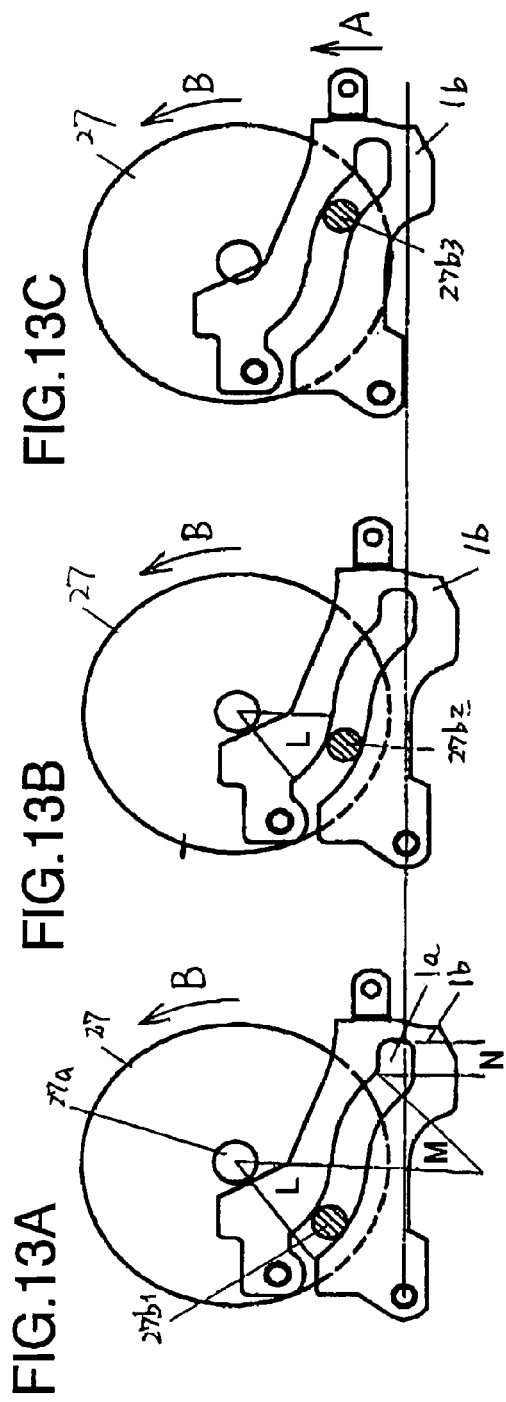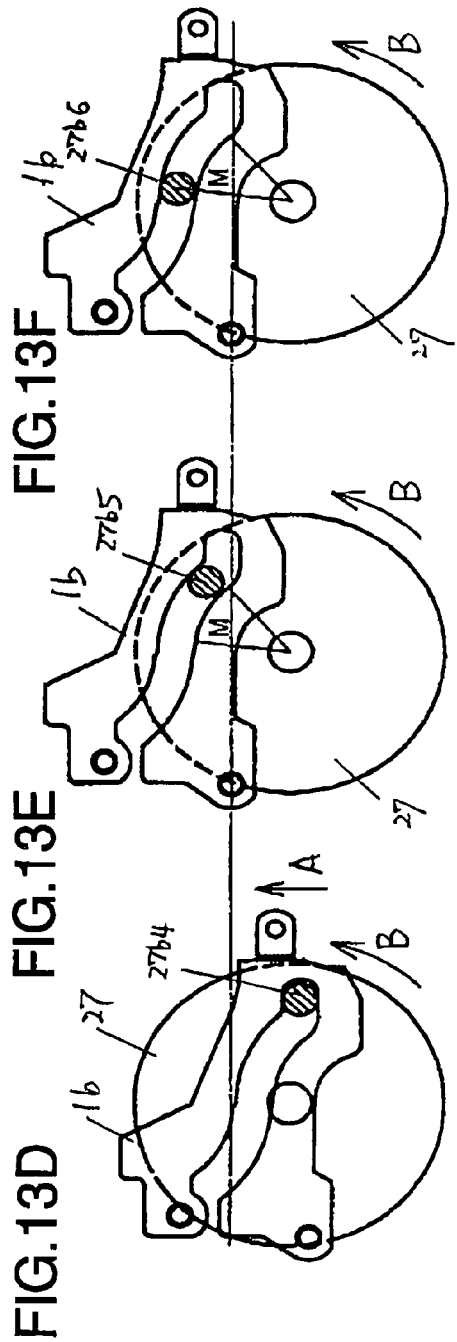

MAGNETIC RECORDING AND REPRODUCTION APPARATUS

This non-provisional application claims priority under 35 U.S.C., §119(a), on Patent Application No. 2003-080271 filed in Japan on Mar. 24, 2003, the entire contents of which are hereby incorporated by reference.

BACKGROUND OF THE INVENTION

1. Field of the Invention

The present invention relates to a magnetic recording and reproduction apparatus for performing information recording and information reproduction with a tape being wound around a rotatable head cylinder over a prescribed angle.

2. Description of the Related Art

Recently, the size of magnetic recording and reproduction apparatuses used for video tape recorders and the like has been reduced more and more.

Hereinafter, a conventional magnetic recording and reproduction apparatus described in Japanese Laid-Open Publication No. 11-273194 will be described.

FIG. 1 of Japanese Laid-Open Publication No. 11-273194 is a plan view of a conventional magnetic recording and reproduction apparatus in a tape cassette mountable state or position (hereinafter, referred to as the "unloading mode"). FIG. 15 of Japanese Laid-Open Publication No. 11-273194 is a plan view of the magnetic recording and reproduction apparatus in a state where information recording to and information reproduction from a tape can be performed and also a tape can be fast-forwarded (hereinafter, referred to as the "play mode"). FIG. 3 of Japanese Laid-Open Publication No. 11-273194 is a plan view of the magnetic recording and reproduction apparatus shown in FIG. 1 (unloading mode), except that a sub chassis is not shown. FIG. 5 of Japanese Laid-Open Publication No. 11-273194 shows a structure of a mechanism for driving an S boat and a T boat provided on a rectangular main chassis. As shown in FIG. 3 of Japanese Laid-Open Publication No. 11-273194, a mechanism for driving a plurality of tape pull-out members (for example, the mechanism shown in FIG. 5 of Japanese Laid-Open Publication No. 11-273194) is provided on the main chassis. The plurality of tape pull-out members are, for example, an S boat 39, a T boat 40, a tension arm 12 (FIG. 15) and a T4 arm 28 (FIG. 15) for pulling out a tape from a cassette and winding the tape around the rotatable head cylinder 38.

Due to such a structure, the main chassis needs to have an area for supporting the above-mentioned various elements. As a result, in the state shown in FIG. 15, the main chassis is substantially flush with the sub chassis along a forward end thereof, i.e., an end opposite to an end along which the rotatable head cylinder 38 is provided. It is not possible to further reduce the size of the magnetic recording and reproduction apparatus.

SUMMARY OF THE INVENTION

A magnetic recording and reproduction apparatus according to the present invention includes a main chassis having a rotatable head cylinder provided thereon; and a sub chassis on which a tape cassette is mountable. The sub chassis is movable with respect to the main chassis between a tape cassette mountable position and a tape pull-out completion position, and the tape cassette mountable position is a position at which the tape cassette is mountable on the sub chassis and the tape pull-out completion position is a position at which information recording to and information reproduction from the tape, which has been pulled out from the tape cassette and has been wound around the rotatable head cylinder, can be performed. A portion of the main chassis along a forward end thereof is cut out toward the rotatable head cylinder.

In one embodiment of the invention, the magnetic recording and reproduction apparatus further includes a rotatable capstan for driving the tape; a supply reel stand engaged with a supply reel of the tape cassette; a take-in reel stand engaged with a take-in reel of the tape cassette; and an idler engaged with the supply reel stand or the take-in reel stand in accordance with a rotation direction of the capstan so as to drive and rotate the supply reel stand or the take-in reel stand. The idler is pivotably provided on the main chassis. At least one of sections of the portion of the main chassis along the forward end thereof, each section being to a side of the pivoting shaft of the idler, is cut out to a position beyond the pivoting shaft of the idler toward the rotatable head cylinder.

In one embodiment of the invention, the forward end of the main chassis has an L-shaped cross-section.

In one embodiment of the invention, the magnetic recording and reproduction apparatus further includes a plurality of tape pull-out members operable to pull out the tape from the tape cassette, wherein all of the plurality of tape pull-out members are provided on the sub chassis.

In one embodiment of the invention, the magnetic recording and reproduction apparatus further includes a plurality of tape pull-out members operable to pull out the tape from the tape cassette, wherein each of the plurality of tape pull-out members operates to pull out the tape from the tape cassette as the sub chassis moves from the tape mountable position to the tape pull-out completion position.

In one embodiment of the invention, the magnetic recording and reproduction apparatus further includes a plurality of tape pull-out members operable to pull out the tape from the tape cassette; at least one guide member for guiding at least one of the plurality of tape pull-out members; at least one arm for driving the at least one tape pull-out member; and a link member for connecting one of the at least one tape pull-out member and one of the at least one arm. The at least one guide member is provided on the main chassis. The at least one arm is provided on the sub chassis. The link member is pivotably engaged with the one of the at least one tape pull-out member at one end of the link member, and is pivotably engaged with the one of the at least one arm at another end of the link member.

Thus, the invention described herein makes possible the advantages of providing a magnetic recording and reproduction apparatus which is reduced in size by partially cutting out a portion of a main chassis along the forward end of the main chassis.

These and other advantages of the present invention will become apparent to those skilled in the art upon reading and understanding the following detailed description with reference to the accompanying figures.

BRIEF DESCRIPTION OF THE DRAWINGS

FIGS. 13A through 13F are plan views illustrating an operation of the sub chassis of the magnetic recording and reproduction apparatus according to the present invention;

DESCRIPTION OF THE PREFERRED EMBODIMENTS

Hereinafter, the present invention will be described by way of illustrative examples with reference to FIGS. 1 through 16.

A magnetic recording and reproduction apparatus according to the present invention includes a main chassis and a sub chassis. Namely, the magnetic recording and reproduction apparatus according to the present invention has a two-chassis structure.

Figure 1:
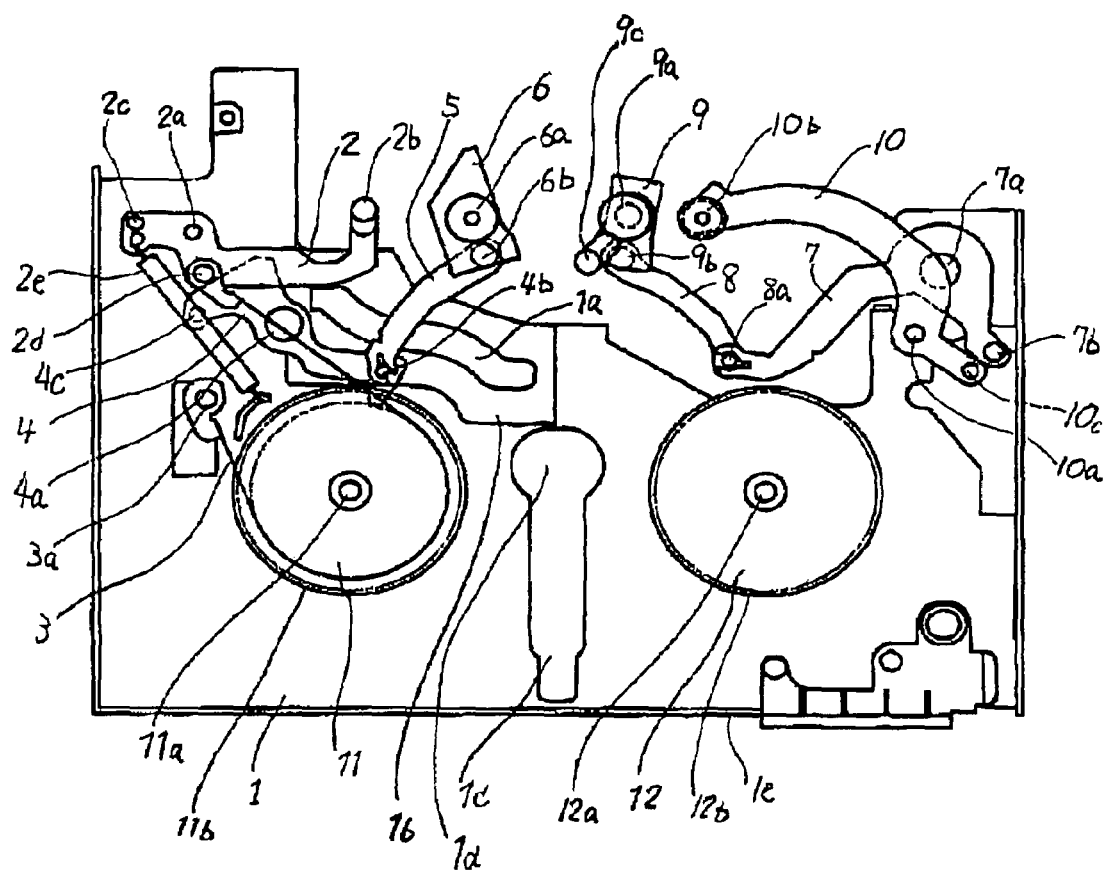
FIG. 1 is a plan view of a sub chassis of a magnetic recording and reproduction apparatus according to the present invention.

First, a structure of a sub chassis 1 of the magnetic recording and reproduction apparatus will be described. FIG. 1 is a plan view of the sub chassis 1.

A sub chassis 1 has a TR arm 2, an S boat 6, a T boat 9 and a T3 arm 10 provided thereon. These tape pull-out members 2, 6, 9 and 10 act to pull out a magnetic tape (not shown in FIG. 1) from a tape cassette.

In FIG. 1, reference numeral 1e represents a "forward end" of the sub chassis 1.

The TR arm 2 is supported so as to be pivotable about a support 2a on the sub chassis 1. A TR post 2b is provided on a top surface of one end of the TR arm 2, and a TR arm driving pin 2c is provided on a bottom surface of the other end of the TR arm 2.

The T3 arm 10 is supported so as to be pivotable about a support 10a on the sub chassis 1. A T3 post 10b is provided on a top surface of one end of the T3 arm 10, and a T3 arm driving pin 10c is provided on a bottom surface of the other end of the T3 arm 10.

An S arm 4 is supported so as to be pivotable about a support 4a on the sub chassis 1. An S arm driving pin 4c is provided on a bottom surface of one end of the S arm 4, and an S link pin 4b is provided on a top surface of the other end of the S arm 4.

An S link 5 is pivotably attached to the S link pin 4b at one end of the S link 5. The S boat 6 is pivotably attached to the other end of the S link 5 via a boss 6b.

A T arm 7 has substantially the same structure as that of the S arm 4. Specifically, the T arm 7 is supported to be pivotable about a support 7a on the sub chassis 1. A T arm driving pin 7b is provided on a bottom surface of one end of the T arm 7, and a T link pin 8a is provided on a top surface of the other end of the T arm 7.

A T link 8 is pivotably attached to the T link pin 8a at one end of the T link 8. The T boat 9 is pivotably attached to the other end of the T link 8 via a boss 9b.

The S boat 6 has an S roller post 6a standing thereon for guiding the magnetic tape, and the T boat 9 has a T roller post 9a and a Ti post 9c standing thereon for guiding the magnetic tape.

As described above, all the tape pull-out members 2, 6, 9 and 10 are provided on the sub chassis 1.

An S reel stand 11 (supply reel stand) and a T reel stand 12 (take-in reel stand) are supported so as to be pivotable about a shaft 11a and a shaft 12a, respectively. A gear portion 11b is provided around an outer circumference of the S reel stand 11, and a gear portion 12b is provided around an outer circumference of the T reel stand 12. The S reel stand 11 is engaged with a supply reel of the tape cassette (not shown) and the T reel stand 12 is engaged with a take-in reel of the tape cassette (not shown) when the tape cassette is mounted on the sub chassis 1. This engagement allows the magnetic tape to be taken in.

A brake band (TR band) 3 for controlling the tension of the magnetic tape while the magnetic tape is running is wound around the S reel stand 11. One end of the TR band 3 is supported about a pivotable member 2d of the TR arm 2, and the other end of the TR band 3 is supported about a pivotable member 3a on the sub chassis 1. While the magnetic tape is running, a load acts on the S reel stand 11 via the TR band 3 by a force of a TR spring 2e attached to the TR arm 2.

In a sub chassis adjusting plate 1b, a groove 1a is formed. The sub chassis adjusting plate 1b is secured to the sub chassis 1 by a screw (not shown). The sub chassis 1 has a lengthy hole 1a and a circular hole 1d communicated with the lengthy hole 1c at an end of the lengthy hole 1c opposite to the forward end 1e. In FIG. 1, a first cover plate 36, a second cover plate 37, and photosensors 38a and 38b are omitted for simplicity (these elements are shown in, for example, FIGS. 7, 8 and 9).

Figure 2:
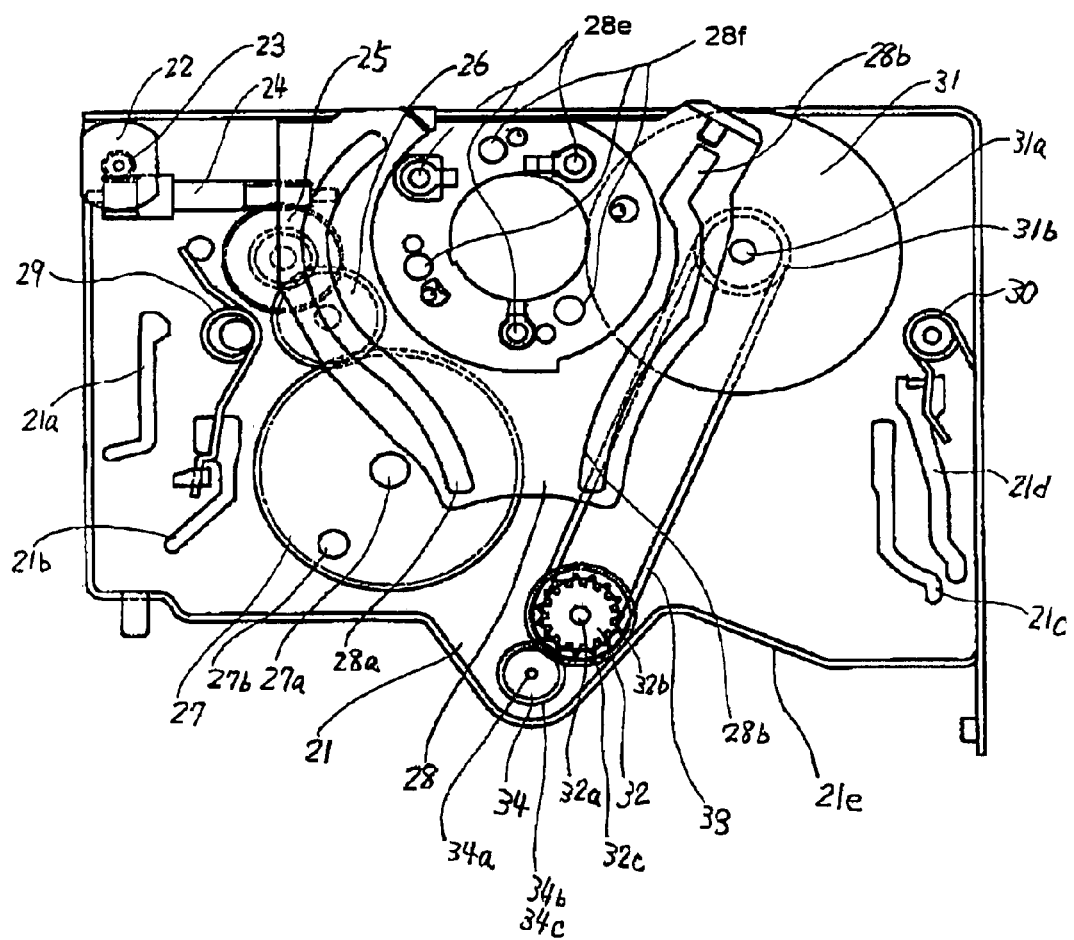
FIG. 2 is a plan view of a main chassis of the magnetic recording and reproduction apparatus according to the present invention.

Next, a structure of a main chassis 21 of the magnetic recording and reproduction apparatus will be described. FIG. 2 is a plan view of the main chassis 21.

The main chassis 21 has four cam grooves 21a, 21b, 21c and 21d formed therein.

Figure 4:
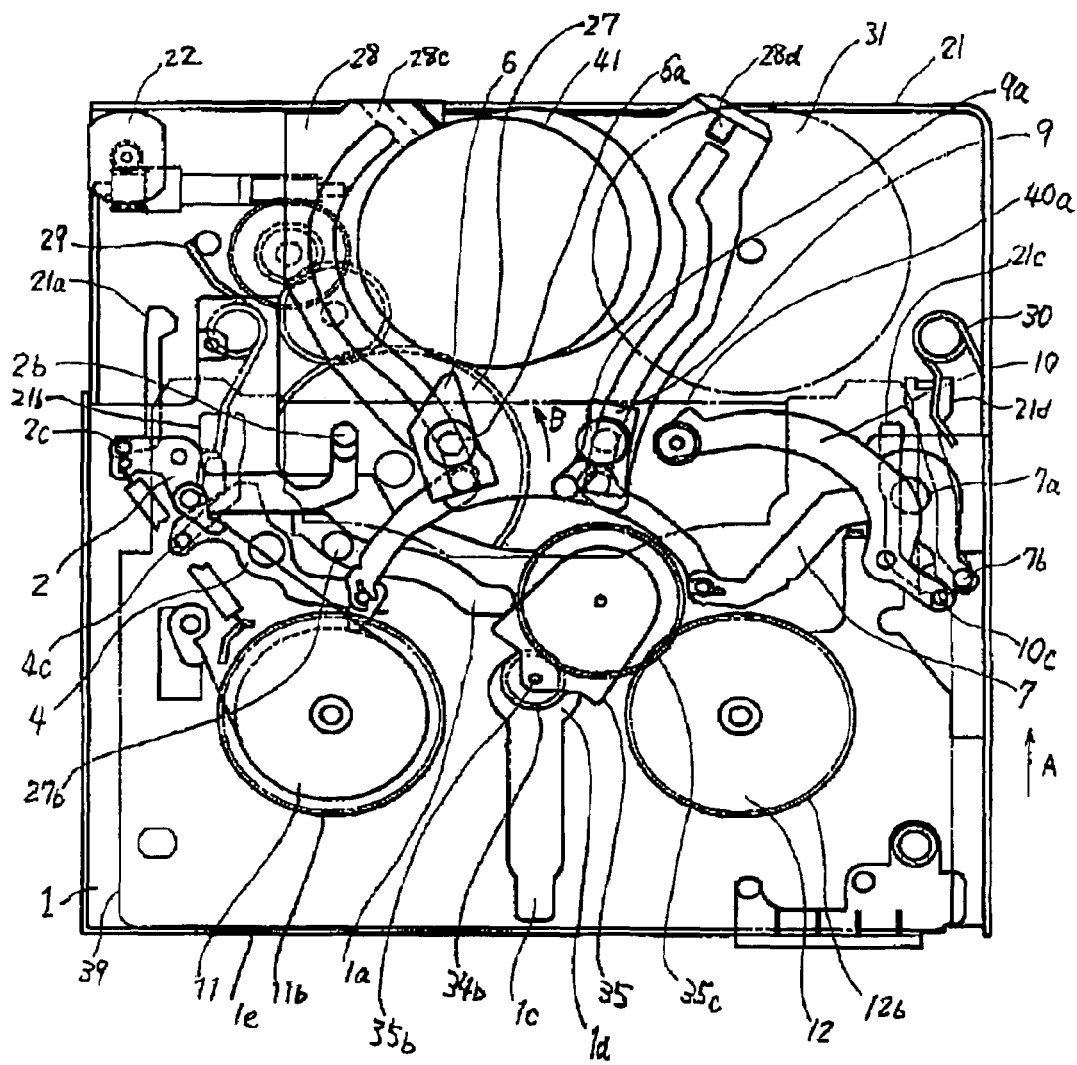
FIG. 4 is a plan view of the magnetic recording and reproduction apparatus according to the present invention in a tape cassette mountable state, from which a first cover plate and a second cover plate are omitted.

In FIG. 2, reference numeral 21e represents a "forward end" of the main chassis 21. A portion of the main chassis 21 along the forward end 21e is significantly cut out toward the rotatable head cylinder 41 (FIG. 4). The forward end 21e has an L-shaped cross-section in the thickness direction of the magnetic recording and reproduction apparatus. The forward end 21e has a certain thickness.

A motor 22 is rotatable forward and backward. A rotation force of the motor 22 is conveyed to a mode gear 27 via a motor worm 23, a connection worm 24, and gears 25 and 26. The mode gear 27 is pivotable about a support 27a. A sub chassis driving pin 27b is provided on a top surface of the mode gear 27. The sub chassis driving pin 27b is engaged with the sub chassis 1 (FIG. 1), so that the sub chassis 1 is movable relative to the main chassis 21.

A cylinder base 28 is secured to the main chassis 21 via three cylinder screw holes 28e. A cylinder (not shown) is provided on the cylinder base 28, and is secured with three cylinder screw holes 28f which are screwed from a rear surface of the cylinder base 28.

Guide grooves 28a and 28b are respectively provided for guiding the S boat 6 and the T boat 9 mounted on the sub chassis 1 when the S boat 6 and the T boat 9 pull out the magnetic tape from the tape cassette. Elastic twisted coil springs 29 and 30 are secured on the main chassis 21 in the state of being provided with a pressure by a prescribed force.

Figure 10:
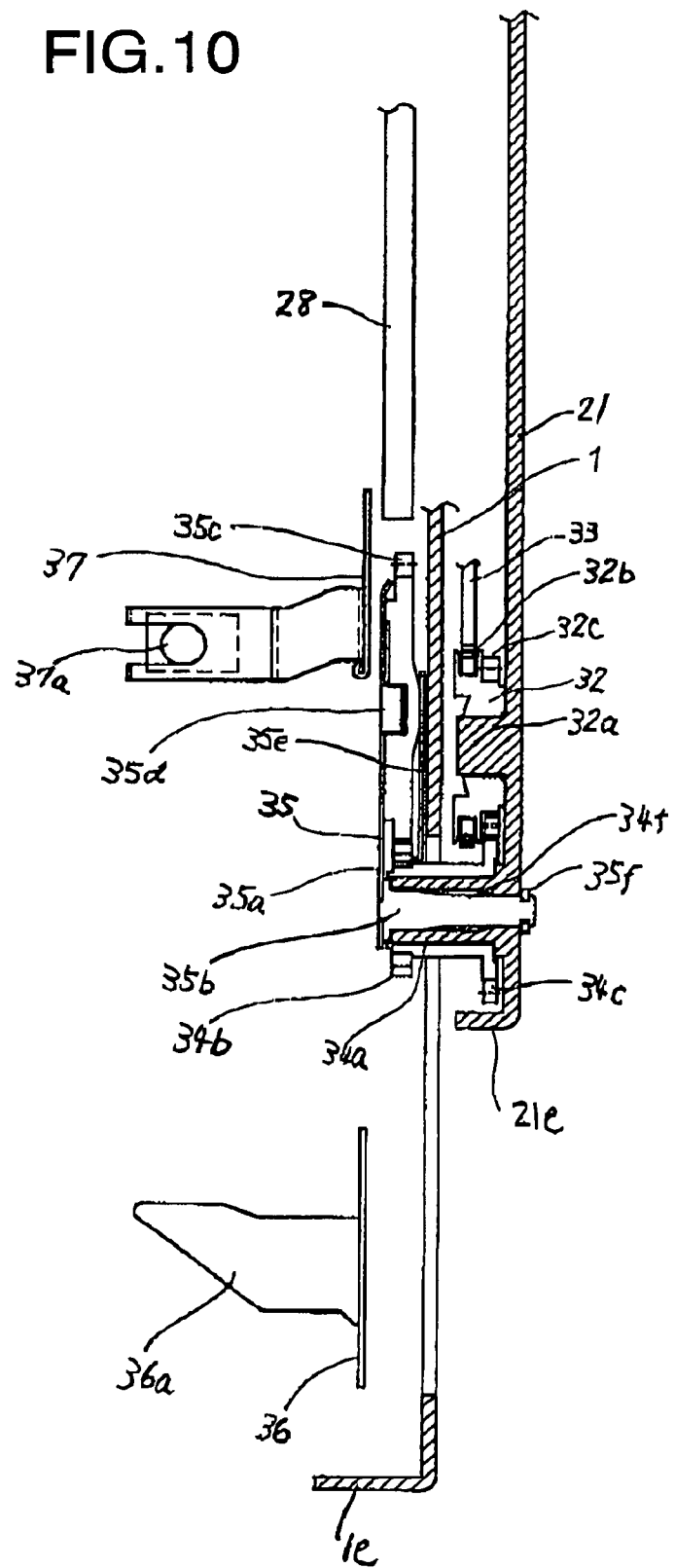
FIG. 10 is a partial cross-sectional view of the magnetic recording and reproduction apparatus according to the present invention taken along line G1 shown in FIG. 7.
Figure 11:
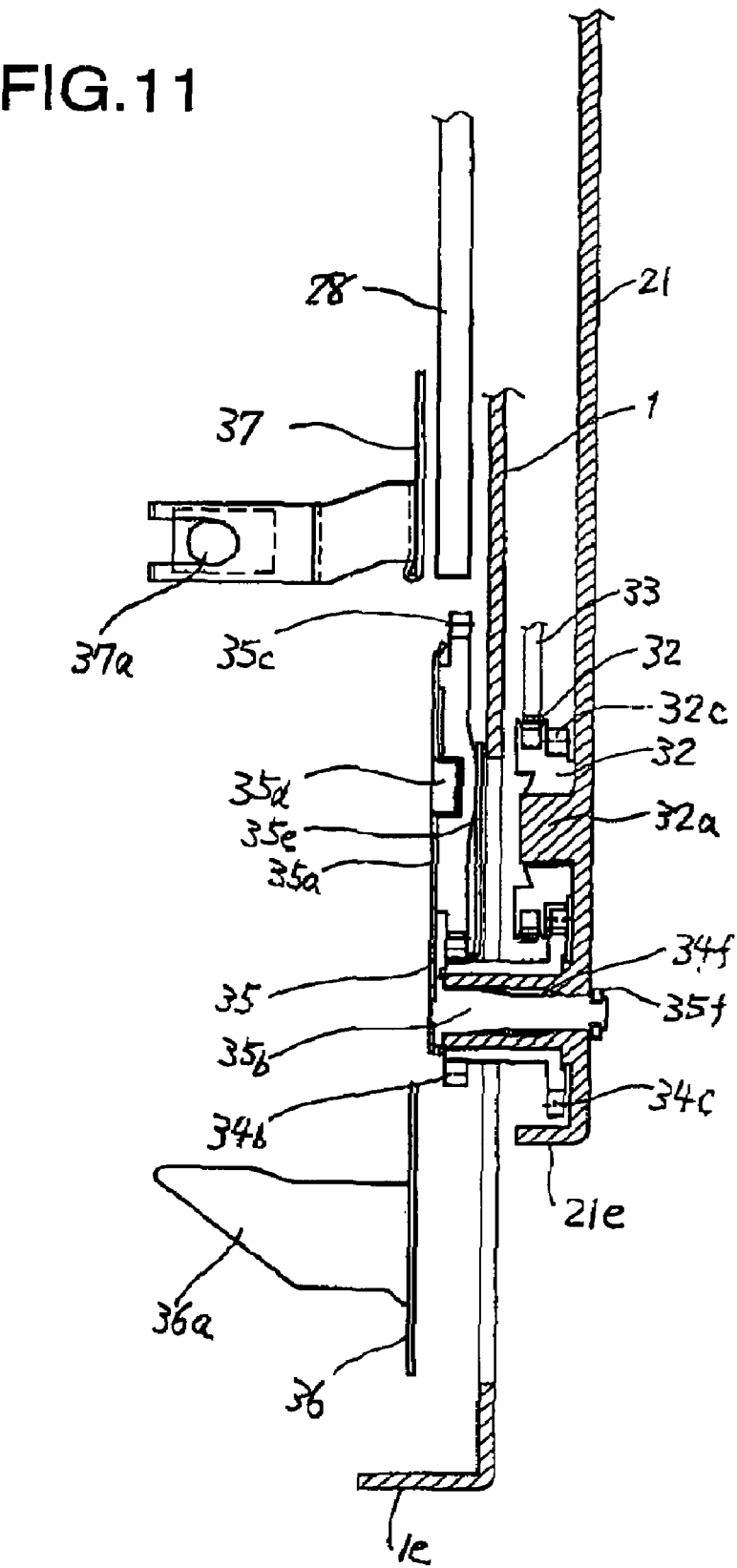
FIG. 11 is a partial cross-sectional view of the magnetic recording and reproduction apparatus according to the present invention taken along line G2 shown in FIG. 8.
Figure 12:
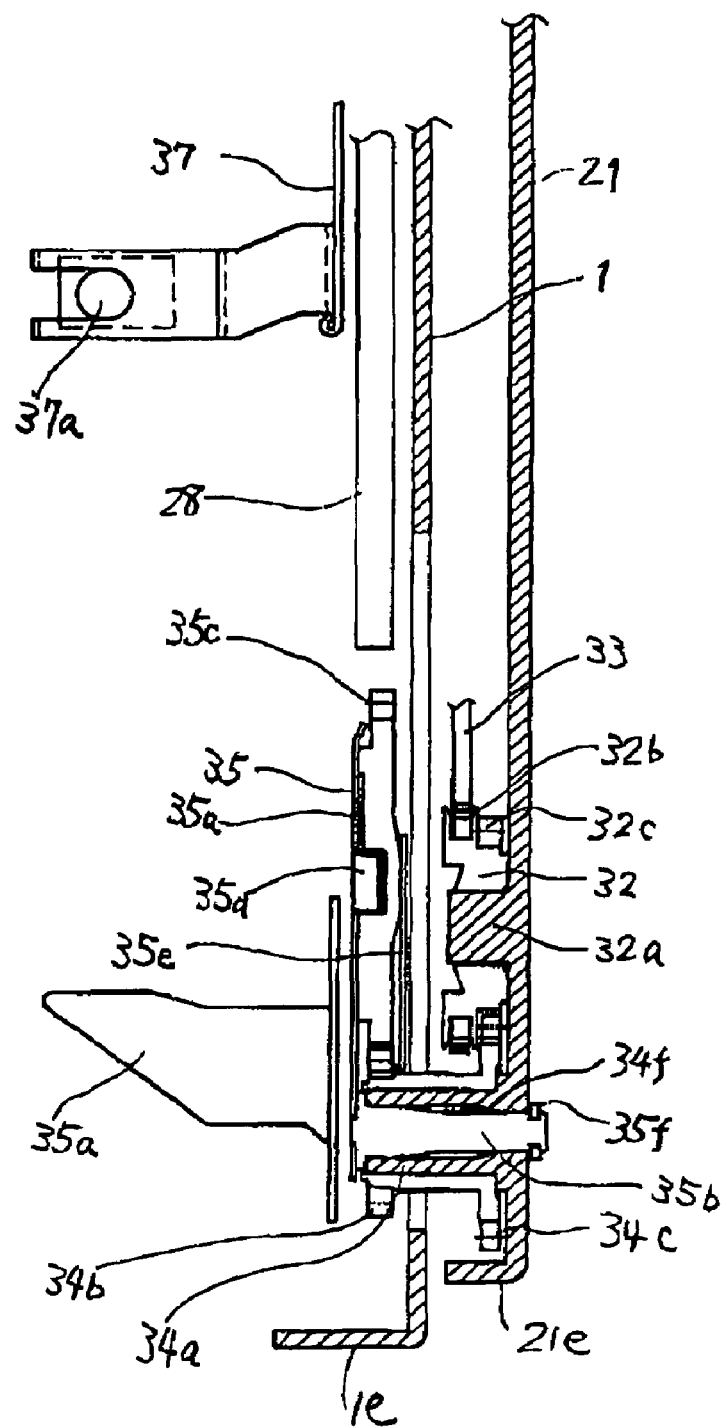
FIG. 12 is a partial cross-sectional view of the magnetic recording and reproduction apparatus according to the present invention taken along line G3 shown in FIG. 9.

A capstan 31 has a capstan shaft 31a standing thereon. A pinch roller (not shown) is pressed to the capstan shaft 31a with the tape sandwiched therebetween, thereby driving the tape. A drive gear 32 is supported at an axis thereof by a rotation shaft 32a provided on the main chassis 21. The drive gear 32 includes an upper gear 32b and a lower gear 32c. A timing belt 33 is extended around the upper gear 32b and a capstan gear 31b integral with the capstan 31. A center gear 34 is supported at an axis thereof by a rotation shaft 34a provided on the main chassis 21. The center gear 34 includes an upper gear 34b and a lower gear 34c. The lower gear 32c of the drive gear 32 and the lower gear 34c of the center gear 34 are engaged with each other (FIGS. 10 through 12).

Figure 3:
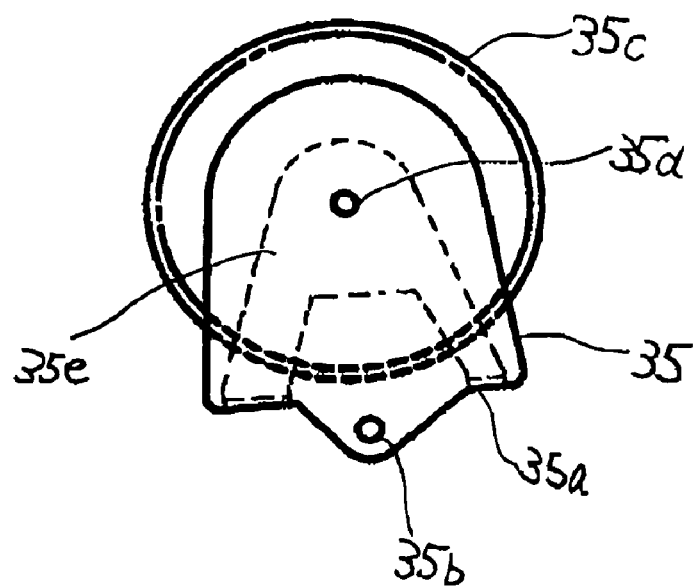
FIG. 3 is a plan view of an idler of the magnetic recording and reproduction apparatus according to the present invention.

FIG. 3 is a plan view of an idler 35. The idler 35 includes an idler arm 35a, an idler gear 35c, and an idler gear pressing section 35e. The idler arm 35a is held on the main chassis 21 so as to be pivotable about a pivoting shaft 35b. The idler gear 35c is held on the idler arm 35a so as to be rotatable about a rotation shaft 35d. The idler gear pressing section 35e is integral with the idler arm 35a. The idler gear pressing section 35e presses the idler gear 35c to generate a rotation load torque in the idler gear 35c.

Figure 5:
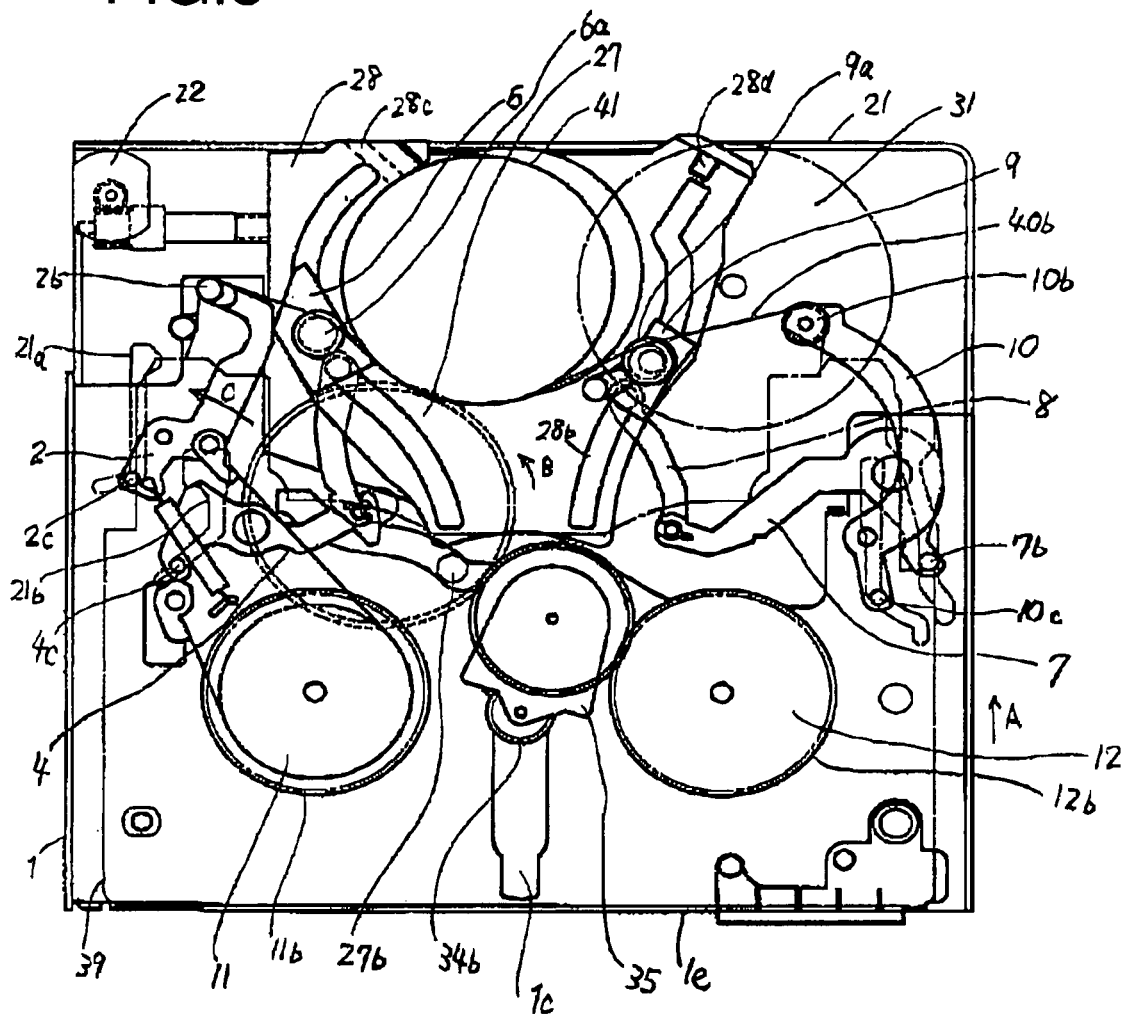
FIG. 5 is a plan view of the magnetic recording and reproduction apparatus according to the present invention in the middle of loading, from which the first cover plate and the second cover plate are omitted.
Figure 6:
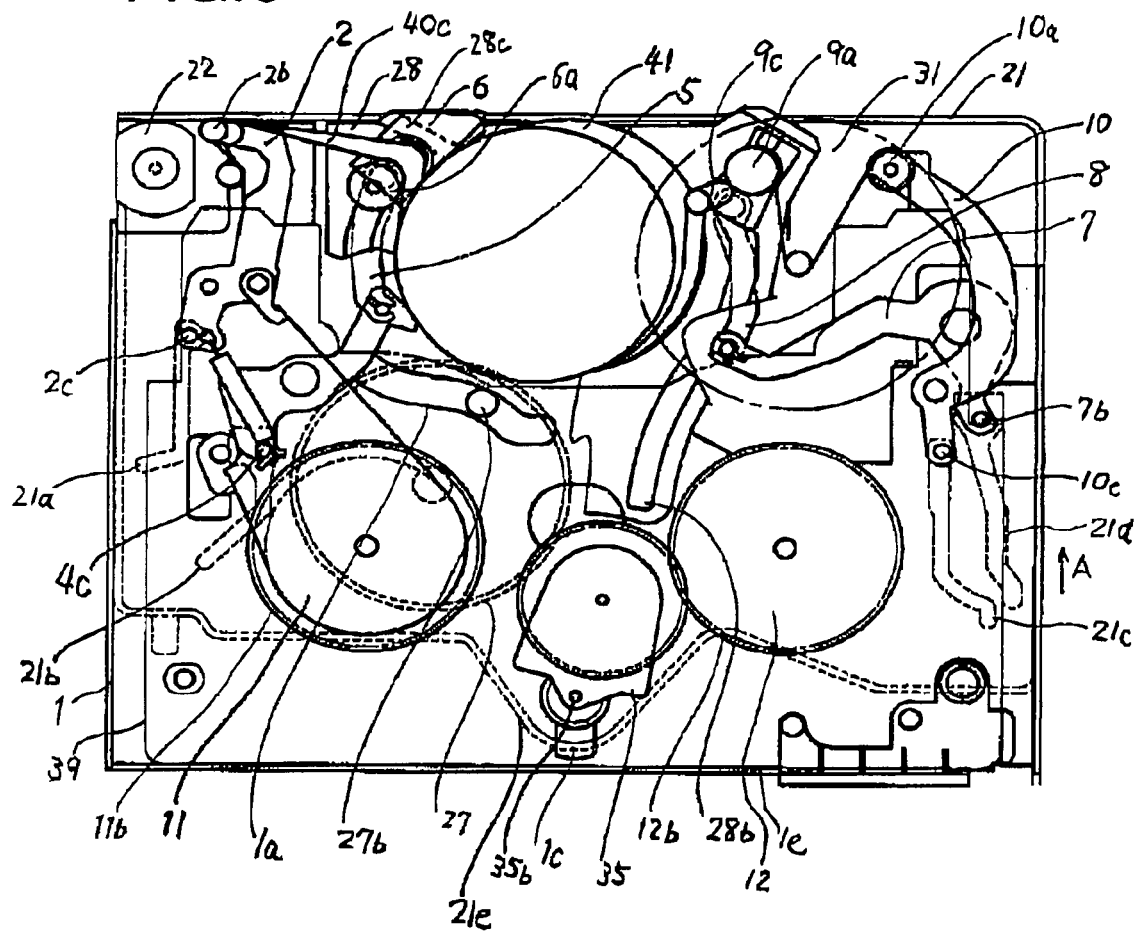
FIG. 6 is a plan view of the magnetic recording and reproduction apparatus according to the present invention in a recording and reproduction state, from which the first cover plate and the second cover plate are omitted.

FIG. 4 is a plan view of the magnetic recording and reproduction apparatus according to the present invention in a tape cassette mountable state. FIG. 5 is a plan view of the magnetic recording and reproduction apparatus in the middle of loading. FIG. 6 is a plan view of the magnetic recording and reproduction apparatus in a recording and reproduction state. In FIGS. 4, 5 and 6, the first cover plate 36, the second cover plate 37, and the photosensors 38a and 38b are omitted for simplicity (these elements are shown in, for example, FIGS. 7, 8 and 9).

Figure 7:
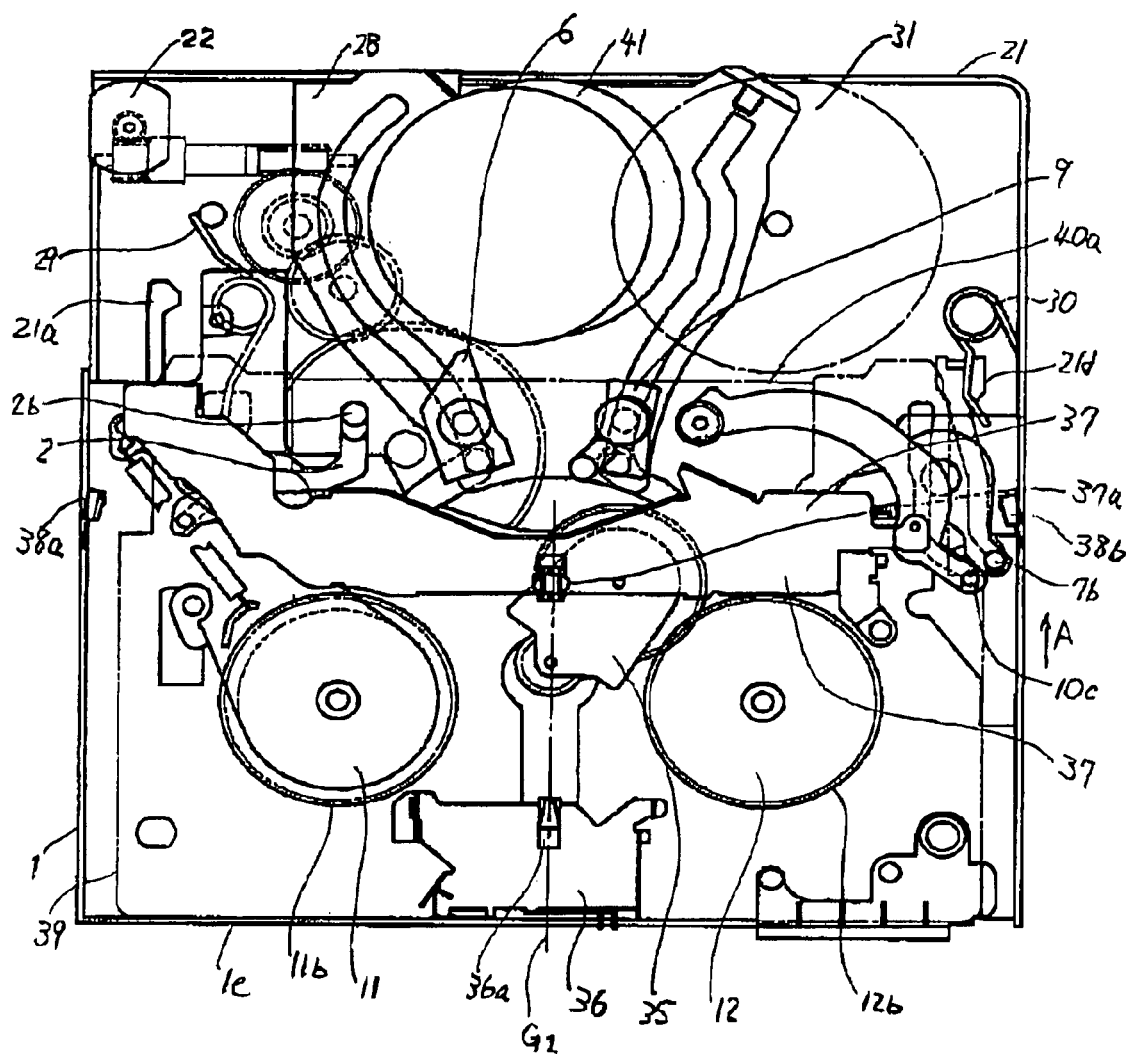
FIG. 7 is a plan view of the magnetic recording and reproduction apparatus according to the present invention in the tape cassette mountable state.
Figure 8:
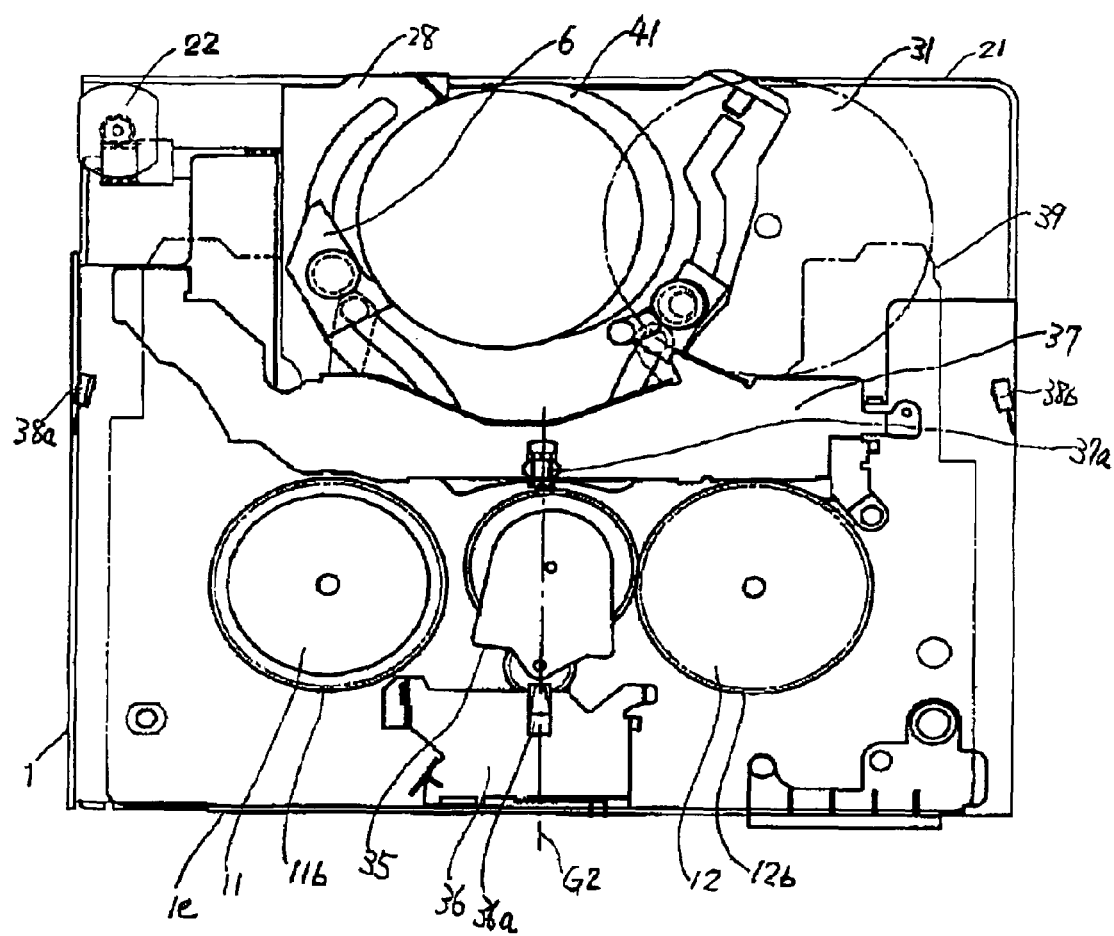
FIG. 8 is a plan view of the magnetic recording and reproduction apparatus according to the present invention in the middle of loading.
Figure 9:
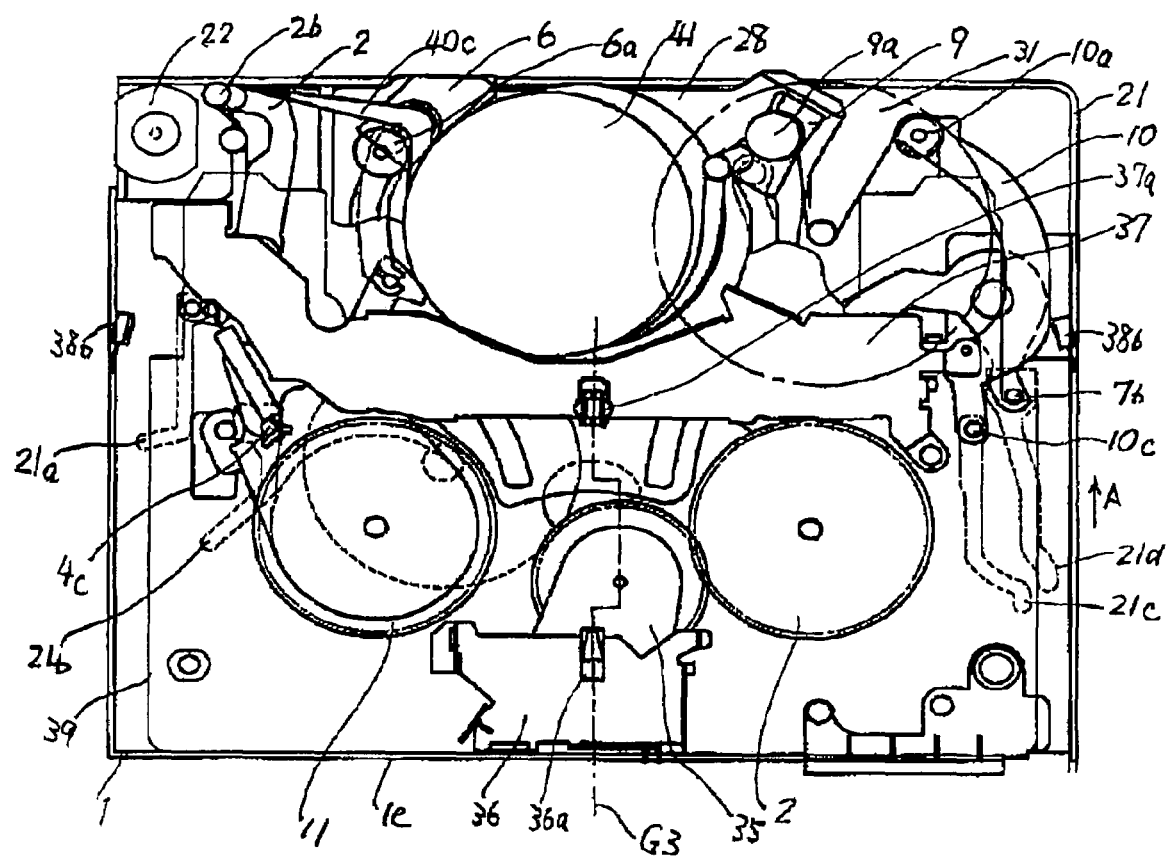
FIG. 9 is a plan view of the magnetic recording and reproduction apparatus according to the present invention in the recording and reproduction state.

FIG. 7 is a plan view of the magnetic recording and reproduction apparatus according to the present invention in the tape cassette mountable state. FIG. 8 is a plan view of the magnetic recording and reproduction apparatus in the middle of loading. FIG. 9 to a plan view of the magnetic recording and reproduction apparatus in the recording and reproduction state. In FIG. 8, some of the components on the sub chassis 1 and some of the components on the main chassis 21 are omitted for simplicity.

FIG. 10 is a partial cross-sectional view of the magnetic recording and reproduction apparatus taken along line G1 shown in FIG. 7. FIG. 11 is a partial cross-sectional view of the magnetic recording and reproduction apparatus taken along line G2 shown in FIG. 8. FIG. 12 is a partial cross-sectional view of the magnetic recording and reproduction apparatus taken along line G3 shown in FIG. 9.

Hereinafter, with reference to FIGS. 4 through 12, the structure and operation of the magnetic recording and reproduction apparatus according to the present invention will be described.

As described above, the drive gear 32 is supported at an axis thereof by the rotation shaft 32a provided on the main chassis 21. The drive gear 32 includes the upper gear 32b and the lower gear 32c. The timing belt 33 is extended around the upper gear 32b and the capstan gear 31b integral with the capstan 31. The center gear 34 is supported at an axis thereof by the rotation shaft 34a provided on the main chassis 21. The center gear 34 includes the upper gear 34b and the lower gear 34c. The lower gear 32c of the drive gear 32 and the lower gear 34c of the center gear 34 are engaged with each other. The pivoting shaft 35b of the idler 35 is inserted into a boss portion 34f of the rotation shaft 34a provided on the main chassis 21 and is held by a cut washer 35f. The upper gear 34a of the center gear 34 is engaged with the idler gear 35c. The rotation shaft 34a provided on the main chassis 21 passes through the lengthy hole 1c in the sub chassis 1. Owing to such a structure, the rotation of the capstan 31 is conveyed to the idler 35 via the timing belt 33, the drive gear 32 and the center gear 34. The idler 35 is engaged with the gear portion 11b around the S reel stand 11 or the gear portion 12b around the T reel stand 12 depending on the rotation direction of the capstan 31. Thus, the S reel stand 11 or the T reel stand 12 is rotated.

As shown in FIG. 7, the first cover plate 36 is provided on the sub chassis 1. On a top surface of the first cover plate 36, a reel lock release member 36a for releasing a reel lock mechanism (not shown; provided in a cassette 39) is provided. The reel lock release member 36a is inserted into the cassette 39 when the cassette 39 is mounted on the sub chassis 1 and releases the reel lock mechanism in the cassette 39.

The second cover plate 37 is also provided on the sub chassis 1. An LED 37a to provided on a top surface of the second cover plate 37. Light emitted from the LED 37a passes through the cassette 39 and then is sensed by the photosensors 38a and 38b respectively provided on two side surfaces of the sub chassis 1. Thus, a leading end and a trailing end of the tape are detected.

The magnetic recording and reproduction apparatus according to the present invention is assembled as follows. The sub chassis 1 (FIG. 1) is stacked on the main chassis 21 (FIG. 2), and then the idler 35 (FIG. 3) is mounted. When the sub chassis 1 is stacked on the main chassis 21, the upper gear 34a of the center gear 34 is inserted into the circular hole 1d in the sub chassis 1. The idler 35 is inserted between the first cover plate 36 and the second cover plate 37 in the state of FIGS. 8 and 11.

In FIGS. 4 and 7, the sub chassis 1 is guided by a guide section (not shown) so as to be movable with respect to the main chassis 21 in a direction represented by arrow A. The TR arm driving pin 2c of the TR arm 2 is slidably engaged with the cam groove 21a of the main chassis 21. The T3 arm driving pin 10c of the T3 arm 3 is slidably engaged with the cam groove 21c of the main chassis 21. The S arm driving pin 4c of the S arm 4 is engaged with the cam groove 21b of the main chassis 21. The T arm driving pin 7b of the T arm 7 is engaged with the cam groove 21d of the main chassis 21.

The sub chassis driving pin 27*b* on the mode gear 27 on the main chassis 21 is engaged with the groove 1*a* of the sub chassis adjusting plate 1*b* (FIG. 1).

As described above, in FIG. 4, the magnetic recording and reproduction apparatus is in the tape cassette mountable state in which the tape cassette 39 can be mounted on the sub chassis 1 or taken out from the sub chassis 1. In this state, the posts 2*b*, 6*a*, 9*a* and 10*b* of the tape pull-out members 2, 6, 9 and 10 are all inside the perimeter of the magnetic tape (represented by reference numeral 40*a* in FIG. 4), i.e., in the opening of the tape cassette. When the motor 22 rotates in this state, the mode gear 27 pivots in a direction represented by arrow B. As a result, the sub chassis driving pin 27*b* also moves in the direction of arrow B. As a result, the sub chassis driving pin 27*b* moves in the groove 1*a* of the sub chassis adjusting plate 1*b*, which moves the sub chassis 1 in the direction of arrow A.

With reference to FIGS. 13A through 13F, an operation of the sub chassis 1 driven by the mode gear 27, i.e., an operation of the sub chassis adjusting plate 1*b* secured to the sub chassis 1 will be described.

In FIG. 13A, the sub chassis driving pin 27*b* is at a tape cassette take-out position 27*b*1 (the same position as in FIGS. 4, 7 and 10). As shown in FIG. 13A, the groove 1*a* of the sub chassis adjusting plate 1*b* includes an arc portion L, an arc portion M continuous with the arc portion L, and a straight portion N continuous with the arc portion M. A circle including the arc portion L and a circle including the arc portion M have an identical radius. The arc portion L and the arc portion N are projected in opposite directions from each other.

In FIG. 13B, the sub chassis driving pin 27*b* is at a tape cassette insertable position 27*b*2. The sub chassis driving pin 27*b*, which is at the position 27*b*1 in FIG. 13A, has been moved in the arc portion L and is located at the position 27*b*2 in FIG. 13B. The shape of the arc portion L is the same as the shape of an arc having the center thereof at the support 27*a*, about which the mode gear 27 is pivotable. The arc portion L is concentric with an arc drawn by the movement of the sub chassis driving pin 27*b* about the center of the mode gear 27. More specifically, the radius of the arc portion L is the same as the radius of an arc drawn by the center of the sub chassis driving pin 27*b* when the sub chassis driving pin 27*b* moves about the center of the mode gear 27. Therefore, the sub chassis adjusting plate 1*b* does not move in the direction of arrow A. The sub chassis adjusting plate 1*b* should not move since the sub chassis 1 needs to be paused between when the sub chassis driving pin 27*b* is at the tape cassette take-out position and when the sub chassis driving pin 27*b* is at the tape cassette insertable position.

When the mode gear 27 further pivots in the direction of arrow B, the sub chassis driving pin 27*b* moves to a position 27*b*3 in the arc portion M as shown in FIG. 13C. In the state of FIG. 13C, the tape is being pulled out from the tape cassette.

Since the arc portion M is not concentric with an arc drawn by the movement of the sub chassis driving pin 27*b* about the center of the mode gear 27, the sub chassis adjusting plate 1*b* is pushed by the sub chassis driving pin 27*b* so as to move in the direction of arrow A. This means that the sub chassis 1 also moves in the direction of arrow A.

When the mode gear 27 further pivots in the direction of arrow B, the sub chassis driving pin 27*b* reaches a position 27*b*4, where the sub chassis driving pin 27*b* is in engagement with the straight portion N, as shown in FIG. 13D. The sub chassis 1 continuously moves in the direction of arrow A. In the state of FIG. 13D, the tape is still being pulled out from the tape cassette.

When the mode gear 27 further pivots in the direction of arrow B, the sub chassis driving pin 27*b* reaches a stop position 27*b*5 in the arc portion M as shown in FIG. 13E. In this state, the arc portion M is concentric with an arc drawn by the movement of the sub chassis driving pin 27*b* about the center of the mode gear 27. More specifically, the radius of the arc portion M is the same as the radius of an arc drawn by the center of the sub chassis driving pin 27*b* when the sub chassis driving pin 27*b* moves about the center of the mode gear 27. Therefore, the sub chassis adjusting plate 1*b* is in a pause without moving in the direction of arrow A.

In the state of FIG. 13B, the sub chassis driving pin 27*b* is at the stop position 27*b*5 (the same position as in FIGS. 6, 9 and 12). In this state, the tape has been completely pulled out, and the sub chassis 1 is at the utmost position (a tape pull-out completion position). The sub chassis 1 cannot move any further from this state. The mode gear 27 further pivots in the direction of arrow B in order to obtain a play mode in which the magnetic tape can run.

Since the sub chassis driving pin 27*b* is in the arc portion M which is concentric with an arc drawn by the movement of the sub chassis driving pin 27*b* about the center of the mode gear 27, the sub chassis adjusting plate 1*b* does not move in the direction of arrow A. After that, the sub chassis driving pin 27*b* reaches a play position 27*b*6 as shown in FIG. 13F. The play position is also referred to as a tape running position.

When the mode gear 27 pivots in the opposite direction from the direction of arrow B, the above-mentioned components also move in the opposite directions form those described above and the sub chassis 1 adjusting plate 1*b* moves in the opposite direction from the direction of arrow A.

In FIGS. 6, 9, 12, 13E and 13F, the tape is wound around the rotatable head cylinder 41 over a prescribed angle, and thus the tape running system has been completed (i.e., the magnetic recording and reproduction apparatus is ready to run the tape).

As described above, in a simple structure where the sub chassis driving pin 27*b* is provided on the mode gear 27 which is pivotable, the sub chassis 1 can be stopped during a prescribed period and subsequently start moving, with the groove 1*a* of the sub chassis adjusting plate 1*b* being specifically shaped. Since the width of the groove 1*a* can be substantially the same as the diameter of the sub chassis driving pin 27*b*, the sub chassis 1 can be stably driven with no need to provide any extra gap between the groove 1*a* and the sub chassis driving pin 27*b*.

With reference to FIGS. 4 through 6, 7 through 9 and 10 through 12, an operation of pulling out the magnetic tape from the tape cassette by relative movement of the sub chassis 1 with respect to the main chassis 21 will be described.

FIG. 5 shows a state of the magnetic recording and reproduction apparatus where the sub chassis 1 slightly moves in the direction of arrow A from the state shown in FIG. 4. In FIG. 5, the sub chassis driving pin 27*b* and the groove 1*a* of the sub chassis adjusting plate 1*b* have the positional relationship shown in FIG. 13C. The sub chassis driving pin 27*b* reaches the position 27*b*3 shown in FIG. 13C by the movement of the mode gear 27 in the direction of arrow B.

In FIG. 5, as described above, the driving pins 2*a*, 4*c*, 7*b* and 10*c* of the elements 2, 4, 7 and/or respectively in engagement with the cam grooves 21a, 21b, 21d and 21c of the main chassis 21. Owing to such engagements, the elements 2, 4, 7 and 10 respectively pivot in directions represented by arrows C, D, E and F to move to the positions shown in FIG. 5. The S boat 6 and the T boat 9 are respectively guided by the guide grooves 28a and 28b to move to the positions shown in FIG. 5. As a result, the magnetic tape is pulled out to the position as represented by reference numeral 40b.

FIGS. 6, 9 and 12 show a state of the magnetic recording and reproduction apparatus, in which information recording to, or information reproduction from, the magnetic tape (represented by reference numeral 40b) is possible. The sub chassis 1 is at the tape pull-out completion position. This state is obtained from the state in FIG. 5 as a result of the mode gear 27 further moving in the direction of arrow B, the sub chassis 1 further moving in the direction of arrow A, and the tape 40b being wound around a rotatable head cylinder 41 provided on the cylinder base 28 on the main chassis 21. In FIGS. 6, 9 and 12, the sub chassis driving pin 27b and the groove 1a of the sub chassis adjusting plate 1b have the positional relationship shown in FIG. 13E. FIG. 13F shows a state where the mode gear 27 further pivots in the direction of arrow A, the pinch roller (not shown) presses the tape (represented by reference numeral 40c in FIG. 6) to the capstan shaft 31a, and the capstan shaft 31a rotates to drive the tape 40c (play mode). Although the mode gear 27 further pivots in the direction of arrow B from the state shown in FIG. 13E to the state shown in FIG. 13F, the sub chassis 1 does not move in direction of arrow A and stays at the position shown in FIGS. 6, 9 and 12.

In the state shown in FIGS. 6, 9 and 12, the S boat 6 acting to pull out the magnetic tape from the tape cassette is pressed to a positioning member 28c via the S arm 4 and the S link 5 via the twisted coil spring 29 (FIG. 2) and thus the position of the S boat 6 is determined. Similarly, the T boat 9 also acting to pull out the magnetic tape from the tape cassette is pressed to a positioning member 28d via the T arm 7 and the T link 8 via the twisted coil spring 30 (FIG. 2) and thus the position of the T boat 9 is determined.

With reference to FIGS. 14, and 15A through 15C, such a pressing positioning mechanism will be described.

Figure 14:
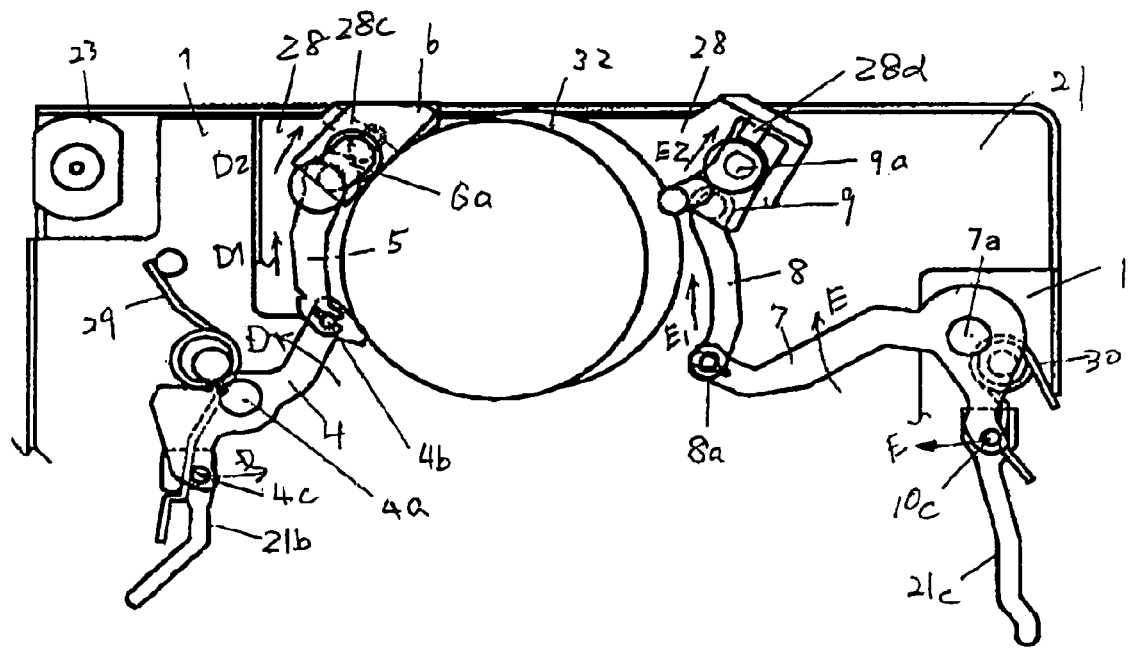
FIG. 14 is a plan view showing a positioning mechanism of the magnetic recording and reproduction apparatus.

FIG. 14 is a partial view of FIGS. 6 and 9. With reference to FIG. 14, a method for determining the position of the S boat 6 will be described.

The S arm 4 on the sub chassis 1 reaches the position shown in FIG. 14 by the S arm driving pin 4c being guided by the cam groove 21b in the main chassis 21. In this state, the S arm driving pin 4c is in contact with the elastic twisted coil spring 29 mounted on the main chassis 21. Accordingly, the S arm 4 is pivoted in the direction of arrow D about the support 4a by the force of the twisted coil spring 29. This force presses the S link 5 in a direction of arrow D1 and presses the S boat 6 in a direction of arrow D2. Thus, the S boat 6 is pressed to the positioning member 28c on the cylinder base 28 and thus positioned here. In this manner, the magnetic tape is completely pulled out. Similarly, the T arm 7 is pivoted in the direction of arrow E about the support 7a by the force of the twisted coil spring 30. This force presses the T link 8 in a direction of arrow E1 and presses the T boat 9 in a direction of arrow E2. Thus, the T boat 9 is pressed to the positioning member 28d on the cylinder base 28 and thus positioned here. In this manner, the magnetic tape is completely pulled out. As described above, a pressing mechanism for the S boat 6 and the T boat 9 can be realized simply by elastic coil springs secured to the main chassis 21. A positioning mechanism for each boat can be realized by quite a simple structure. This contributes to the reduction of the number of components, size reduction and improvement in the quality of the tape pull-out mechanism.

Figure 15A:
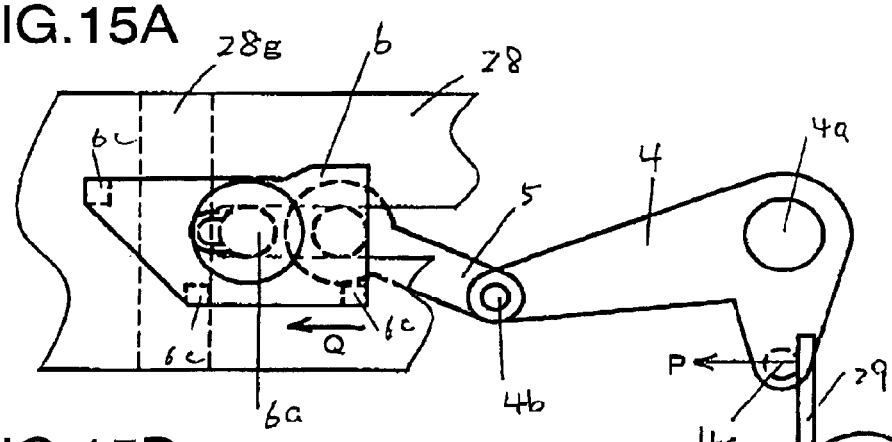
FIG. 15A is a plan view of the positioning mechanism shown in FIG. 14.
Figure 15B:
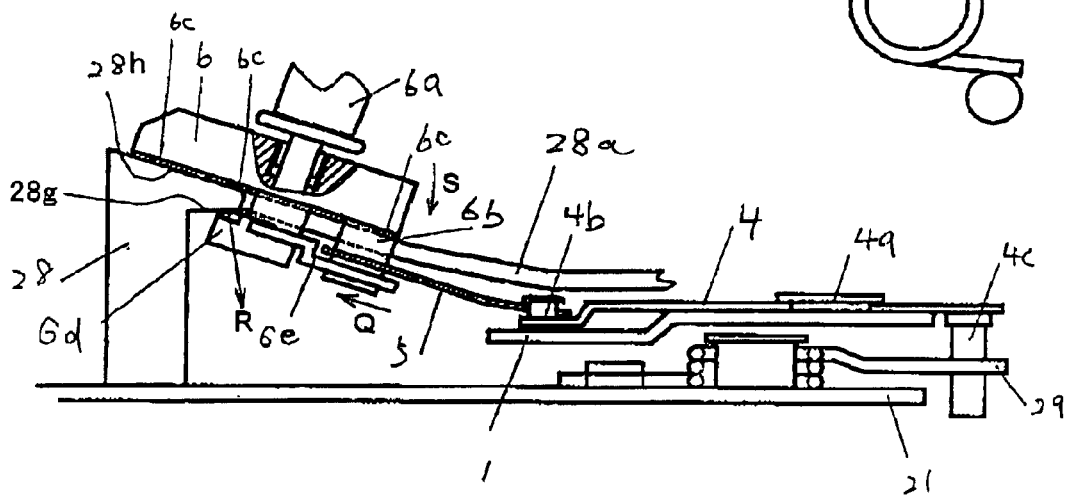
FIG. 15B is a side view thereof.
Figure 15C:
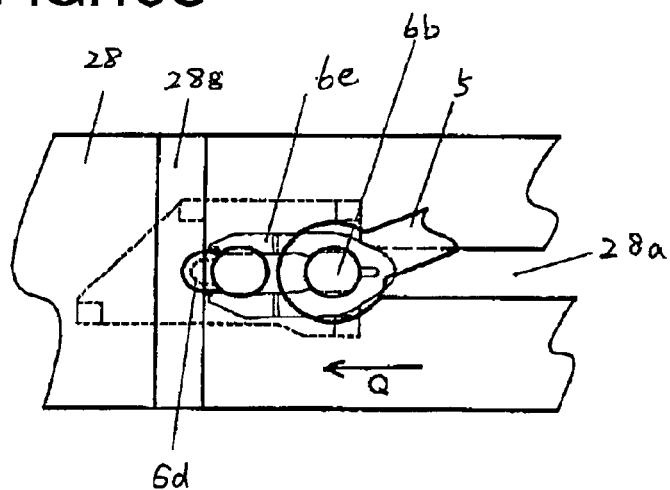
FIG. 15C is a bottom view thereof.
Figure 16:
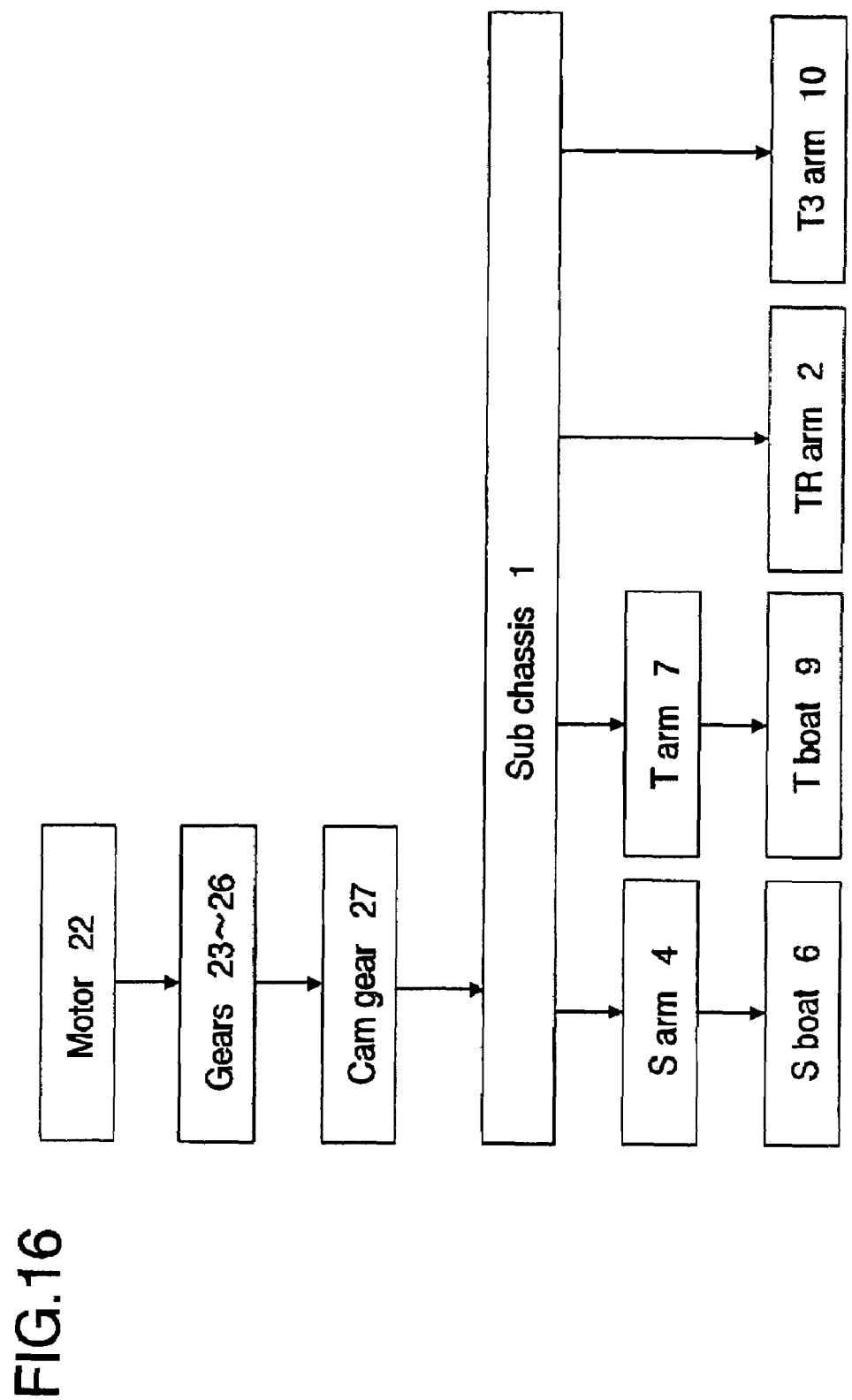
FIG. 16 shows a flow of a force for pulling out a tape from a cassette.

With reference to FIGS. 15A through 15C, the positioning mechanism for the S boat 6 will be described in more detail.

FIG. 15A is a plan view of the positioning mechanism for the S boat 6, FIG. 15B is a side view thereof, and FIG. 15C is a bottom view thereof. In FIGS. 15A through 15C, the elements are shown schematically.

The S arm 4 is urged by the elastic coil spring 29 in a direction represented by arrow P. Thus, a portion of the boss 6b which to below the guide groove 28a is pressed by the S link 5 (FIG. 15B). The S boat 6 includes a projection 6d having a semicircular planar shape (FIG. 15C) integrally provided at a forward position on the bottom thereof. The cylinder base 28 has a ramp surface 28g on a bottom surface thereof in the vicinity of the cylinder (not shown). The ramp surface 28g is provided such that a normal thereto is in a direction of arrow R.

With reference to FIGS. 15A through 15C, an operation of the positioning mechanism for the S boat 6 will be described.

The lower portion of the boss 6b engaged with the S boat 6 is pressed by the S link 5, and thus the projection 6d of the S boat 6 is pressed to the ramp surface 28g of the cylinder base 28. Accordingly, the entire S boat 6 is pressed in the direction of arrow Q while receiving a force in the direction of arrow R. Since the boss 6b is pressed in the direction of arrow Q, the S boat 6 also receives a force in a direction of arrow S. As a result, three points 6c on a bottom surface of the S boat 6 contact a top surface 28h of the cylinder base 28. The top surface 28h of the cylinder base 28 and the bottom surface of the S boat 6 are formed with high precision. By contact of the top surface 28h of the cylinder base 28 and the bottom surface of the S boat 6, the S boat 6 is positioned with respect to the cylinder base 28 with high precision. As described above, the S boat 6 can be positioned with high precision by a simple structure by integrally providing the projection 6d in the S boat 6 and providing the ramp surface 28g to the cylinder base 28. The S roller post 6a is provided on the S boat 6. The tilt of the S roller post 6a with respect to the main chassis 21 is very important for tape running.

The positioning mechanism for the T boat 9 has substantially the same structure and operates in substantially the same manner as described above regarding the S boat 6.

FIG. 9 shows a flow of a force for pulling out the tape from the cassette. As shown in FIG. 9, the flow of a driving force generated by the motor 22 is streamlined. A simple flow of force by which elements acting for pulling out a magnetic tape from the tape cassette are moved by the movement of the sub chassis is realized. Owing to such a system, a large number of components of a mechanism for moving the tape pull-out members, which are conventionally provided on the main chassis, can be eliminated. Therefore, as shown in FIG. 6, the portion of the main chassis 21 along the forward end 21e is significantly cut out such that the forward end 21e is partially separated from the forward end 1e of the sub chassis 1 when the magnetic recording and reproduction apparatus is in the recording and reproduction state. More specifically, the portion of the main chassis 21 is cut out on both sides of the pivoting shaft 35b of the idler 35.

As described above, the magnetic recording and reproduction apparatus according to the present invention includes the sub chassis 1 on which the cassette 39 is mountable and a main chassis 21 having a rotatable head cylinder 41 provided thereon. The main chassis 21 guides the reciprocal movement of the sub chassis 1 toward and from the rotatable head cylinder 41.

The tape cassette mountable state is a state of the magnetic recording and reproduction apparatus where the tape cassette 39 is mountable on the sub chassis 1. The recording and reproduction state is a state of the magnetic recording and reproduction apparatus where the tape running system has been completed. When the tape running system is completed, information recording to and information reproduction from the tape is possible. The tape running system is realized as follows. After the tape cassette 39 is mounted on the sub chassis 1, the sub chassis 1 moves toward the rotatable head cylinder 41, and the tape pull-out members 2, 6, 9 and 10 pull out the tape from the tape cassette 39 and wind the tape around the rotatable head cylinder 39 over a prescribed angle.

Among the components of the idler 35, only the pivoting shaft 35b which needs to be located on the main chassis 21 for driving the S reel stand 11 and the T reel stand 12 is left on the main chassis 21. The other components of the idler 35, which are not specifically needed to be provided on the main chassis 21, are provided on the sub chassis 1. This makes it possible to cut out the portion of the main chassis 21 on both sides of the idler 35. Since other components can be located in the space made by this operation, the size of the magnetic recording and reproduction apparatus can be reduced.

Since the forward end 21e has the L-shaped cross-section in the thickness direction of the magnetic recording and reproduction apparatus, the forward end 21e maintains the main chassis 21 sufficiently strong even though it is cut out.

Since all the tape pull-out members including the TR arm 2, the S boat 6, the T boat 9 and the T3 arm 10 are provided on the sub chassis 21, the main chassis 21 does not need an area for these members. This also makes it possible to cut out the portion of the main chassis 21. Again, since other components can be located in the space made by this operation, the size of the magnetic recording and reproduction apparatus can be reduced.

All the tape pull-out members including the TR arm 2, the S boat 6, the T boat 9 and the T3 arm 10 are driven to pull out the tape by the movement of the chassis 1 with respect to the main chassis 21. This streamlines the flow of a driving force of the motor 22. A very simple flow of force by which each tape pull-out member is driven by the movement of the sub chassis 1 is realized. Owing to such a system, a large number of components of a mechanism for moving the tape pull-out members, which are conventionally provided on the main chassis, can be eliminated. This also makes it possible to cut out the portion of the main chassis 21. As described above, since other components can be located in the space made by this operation, the size of the magnetic recording and reproduction apparatus can be reduced.

The above-mentioned very simple flow of force is realized by the following structure. The S boat 6 having the S roller post 6a for guiding the tape thereon and the T boat 9 having the T roller post 9a and the T1 post 9c for guiding the tape thereon are moved by being guided by the cylinder base 28 (guide member) provided on the main chassis 21. The S arm 4 and the T arm 7 are pivotably provided on the sub chassis 1. The S link 5 (link member) is pivotably engaged at one end with the S arm 4, and is pivotably engaged at the other end with the S boat 6. The T link 8 (link member) is pivotably engaged at one end with the T arm 7, and is pivotably engaged at the other end with the T boat 9. A part of the S arm 4 and a part of the T arm 7 are respectively engaged with a cam groove 21b and a cam groove 21d in the main chassis 21. The sub chassis 1 moves with respect to the main chassis 21. By such movements, the S arm 4 and the T arm 7 are driven, and the S boat 6 and the T boat 9 move along the cylinder base 28 respectively via the S link 5 and the T link 8. Thus, the tape is pulled out. Owing to this structure, the above-mentioned simple flow of force is realized, and the large number of components of the mechanism for driving the tape pull-out members can be provided on the sub chassis 1 and thus eliminated from the main chassis 21.

In the above example, the portion of the main chassis 21 is cut out on both sides of the idler 35, but may be cut out on only one side of the idler 35.

As described above, according to the present invention, the flow of a driving force of the motor 22 to the sub chassis is streamlined. A very simple flow of force by which each tape pull-out member is driven by the movement of the sub chassis is realized. Owing to such a system, a minimum number of necessary components are provided on the main chassis, and a large number of components of a mechanism for moving the tape pull-out members, which are conventionally provided on the main chassis, can be eliminated from the main chassis. This makes it possible to cut out the portion of the main chassis. Therefore, the size of the magnetic recording and reproduction apparatus can be reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic recording and reproduction apparatus, comprising:
    a main chassis having a rotatable head cylinder provided thereon: and
    a sub chassis on which a tape cassette is mountable;
    wherein:
    the sub chassis is movable with respect to the main chassis between a tape cassette mountable position and a tape pull-out completion position, and the tape cassette mountable position is a position at which the tape cassette is mountable on the sub chassis and the tape pull-out completion position is a position at which information recording to and information reproduction from the tape, which has been pulled out from the tape cassette and has been wound around the rotatable head cylinder, can be performed; and
    a portion of the main chassis along a forward end thereof is cut out across the entire forward end of the main chassis toward the rotatable head cylinder.

2. A magnetic recording and reproduction apparatus according to claim 1, further comprising:
    a rotatable capstan for driving the tape;
    a supply reel stand engaged with a supply reel of the tape cassette;
    a take-in reel stand engaged with a take-in reel of the tape cassette; and
    an idler engaged with the supply reel stand or the take-in reel stand in accordance with a rotation direction of the capstan so as to drive and rotate the supply reel stand or the take-in reel stand;
    wherein:
    the idler is pivotably provided on the main chassis; and
    at least one of sections of the portion of the main chassis along the forward end thereof, each section being to a side of the pivoting shaft of the idler, is cut out to a position beyond the pivoting shaft of the idler toward the rotatable head cylinder.

3. A magnetic recording and reproduction apparatus according to claim 1, wherein the forward end of the main chassis has an L-shaped cross-section.

4. A magnetic recording and reproduction apparatus according to claim 1, further comprising a plurality of tape pull-out members operable to pull out the tape from the tape cassette, wherein all of the plurality of tape pull-out members are provided on the sub chassis.

5. A magnetic recording and reproduction apparatus according to claim 1, further comprising a plurality of tape pull-out members operable to pull out the tape from the tape cassette, wherein each of the plurality of tape pull-out members operates to pull out the tape from the tape cassette as the sub chassis moves from the tape mountable position to the tape pull-out completion position.

6. A magnetic recording and reproduction apparatus according to claim 1, further comprising:

a plurality of tape pull-out members operable to pull out the tape from the tape cassette;

at least one guide member for guiding at least one of the plurality of tape pull-out members;

at least one arm for driving the at least one tape pull-out member; and a link member for connecting one of the at least one tape pull-out member and one of the at least one arm;

wherein:

the at least one guide member is provided on the main chassis;

the at least one arm is provided on the sub chassis; and the link member is pivotably engaged with the one of the at least one tape pull-out member at one end of the link member, and is pivotably engaged with the one of the at least one arm at another end of the link member.

* * * * *